(12) United States Patent
Ndeuchi

(10) Patent No.: US 11,605,056 B2
(45) Date of Patent: Mar. 14, 2023

(54) METHOD AND SYSTEM FOR ENABLING USERS TO COLLABORATE AND CREATE ONLINE MULTI-MEDIA STORY

(71) Applicant: Ghislain Ndeuchi, Biel (CH)

(72) Inventor: Ghislain Ndeuchi, Biel (CH)

(73) Assignee: Ghislain Ndeuchi, Pery (CH)

( * ) Notice: Subject to any disclaimer, the term of this patent is extended or adjusted under 35 U.S.C. 154(b) by 207 days.

(21) Appl. No.: 17/247,078

(22) Filed: Nov. 29, 2020

(65) Prior Publication Data
US 2021/0073924 A1    Mar. 11, 2021

Related U.S. Application Data

(60) Provisional application No. 63/114,557, filed on Nov. 17, 2020.

(51) Int. Cl.
*G06Q 50/00* (2012.01)
*G06Q 10/101* (2023.01)
*G06F 16/483* (2019.01)
*G06F 16/958* (2019.01)
*H04L 51/52* (2022.01)

(52) U.S. Cl.
CPC ......... *G06Q 10/101* (2013.01); *G06F 16/483* (2019.01); *G06F 16/958* (2019.01); *G06Q 50/01* (2013.01); *H04L 51/52* (2022.05)

(58) Field of Classification Search
None
See application file for complete search history.

(56) References Cited

U.S. PATENT DOCUMENTS

| | | | |
|---|---|---|---|
| 8,554,020 B2 | 10/2013 | Berger et al. | |
| 8,694,896 B2 | 4/2014 | Edwards et al. | |

(Continued)

FOREIGN PATENT DOCUMENTS

| | | |
|---|---|---|
| CA | 2843056 C | 2/2013 |
| CA | 2881940 C | 9/2017 |
| KR | 101883309 B1 | 7/2018 |

OTHER PUBLICATIONS

M Rabbath, P Sandhaus, S Boll, Automatic creation of photo books from stories in social media, ACM Transactions on Multimedia Computing, Communications, and ApplicationsNov. 2011 Article No. 27.

(Continued)

*Primary Examiner* — Florian M Zeender
*Assistant Examiner* — Karma A El-Chanti

(57) ABSTRACT

The present invention relates to the field of networked computers, social networks and interactive software. More particularly it allows collaboration by plurality of users of networked computers for creating multimedia productions (for example, stories or contents) using interactive software as a platform. As compared to the conventional solutions, the present invention is technically advanced as it enables a gaming like scenario to a group of users where they can cleverly and playfully continue their connection's photo stories by adding photos and captions. The system and method utilizes artificial intelligence and image processing to organize the photo story. It promotes active and social play within the professional world. The present invention promotes a socializing activity among professionals without interfering with professional work. This is a fun game with less energy and time consumption. This can be used/played by all walks of professional life and improve the engagement within the network.

16 Claims, 10 Drawing Sheets

(56) References Cited

U.S. PATENT DOCUMENTS

| | | | |
|---|---|---|---|
| 8,903,927 B2 | 12/2014 | Chen et al. | |
| 9,923,981 B2 | 3/2018 | McDonald et al. | |
| 10,277,550 B2 | 4/2019 | Chen et al. | |
| 10,623,917 B1* | 4/2020 | Paul | G06F 16/9535 |
| 11,093,839 B2* | 8/2021 | Shamma | G06F 16/55 |
| 2008/0306995 A1 | 12/2008 | Newell et al. | |
| 2013/0080467 A1 | 3/2013 | Carson et al. | |
| 2016/0149843 A1* | 5/2016 | Spicer | G06Q 10/101 |
| | | | 709/206 |
| 2017/0149714 A1* | 5/2017 | Valdivia | H04L 51/216 |
| 2017/0149721 A1 | 5/2017 | Brunn et al. | |
| 2019/0266223 A1* | 8/2019 | Reinders | G06F 16/5838 |
| 2020/0089702 A1* | 3/2020 | Chapps | H04N 21/458 |
| 2020/0264736 A1* | 8/2020 | Tomar | H04L 51/10 |
| 2020/0358731 A1* | 11/2020 | Boyd | H04L 51/18 |
| 2021/0037195 A1* | 2/2021 | Cutler | H04N 5/23219 |
| 2022/0005129 A1* | 1/2022 | Snell | G06F 16/48 |

OTHER PUBLICATIONS

Nancy A. Van House, Collocated photo sharing, story-telling, and the performance of self, School of Information, University of California, 102 South Hall #4600, Berkeley, CA 94720-4600, USA.

Alexandra Weilenmann, Instagram at the museum: communicating the museum experience through social photo sharing, CHI '13: Proceedings of the SIGCHI Conference on Human Factors in Computing SystemsApr. 2013 pp. 1843-1852.

Yu Liu, Let your photos talk: generating narrative paragraph for photo stream via bidirectional attention recurrent neural networks, AAAI'17: Proceedings of the Thirty-First AAAI Conference on Artificial IntelligenceFeb. 2017 pp. 1445-1452.

Michele Zappavigna, Social media photography: construing subjectivity in Instagram images, University of New South Wales, Sydney, Australia.

Alexa K Fox, Eat, drink, and create content: a multi-method exploration of visual social media marketing content, International Journal of Advertising, The Review of Marketing Communications,ISSN: 0265-0487 (Print) 1759-3948 (Online).

Spandana Gella, A Dataset for Telling the Stories of Social Media Videos, Proceedings of the 2018 Conference on Empirical Methods in Natural Language Processing, pp. 968-974, Brussels, Belgium, Oct. 31-Nov. 4, 2018. Association for Computational Linguistics.

* cited by examiner

Once upon a time there were 2 birds...

They had a friend who wasn't polite...

And one with a big mouth LOL!...

They had a party...

METHOD AND SYSTEM FOR ENABLING USERS TO COLLABORATE AND CREATE ONLINE MULTI-MEDIA STORY

TECHNICAL FIELD

The present invention relates generally to the field of networked computers and interactive software. More particularly it relates to allowing collaboration by users of networked computers for creating multimedia productions (for example, stories or contents) using interactive software as a platform.

BACKGROUND

Today, in the digital age, more and more software products are being created and sold which assist people with creating stories for presentation to others, such as personalized web sites with features such as digital images. These software tools allow a user to add elaborate enhancements to a web site, such as streaming video. The availability of products such as digital cameras, scanners and MP3 (MPeg Audio Layer 3) devices has enabled today's home computer to become the hub of a family's multimedia productions. The drawback is that the products require a level of computer knowledge and experience that is above the comfort zone of the novice or occasional computer user.

Collaboration software exists that allows multiple people to contribute to a single document through a network such as the Internet. However, typical collaborative software provides only review and revision functions for existing documents and offers no capability for the multiple users to collaborate in creating an entirely new document online. Furthermore, the type of content that can be contributed to an existing document by the multiple users is limited.

Screenwriters can use text-editing software to help them write their stories in text-only format. But in order to build and present a story with images and sounds, more sophisticated tools are required. These tools are available in various software products including photo editors, storyboard editors, sound editing tools, video editors, and presentation tools, etc. The drawback to these specialized tools is twofold: first, the specialized software product may be "overkill" for the average user. A user who needs a photo editing tool merely to crop a photo and add a caption to that photo will find little use for most of the features in a specialized photo editing software product.

Second, the specialized nature of these products limits their use to one or two specific features, necessitating the use of two, three, or more products in order to build a multimedia story. Each additional product not only increases the expense involved, but it creates an additional burden to the user who must learn how to use these varied and complex tools.

While more and more writers are turning to software products to help them write stories, there is a need for a comprehensive, user-friendly software product which helps a writer "build" a complete story, using text, sound, and images. Also, while many users of the World Wide Web provide the opportunity for collaboration. Users can create content, share that content, and allow others to improve on that content. In at least one case, this has allowed users to collaborate to create an online encyclopedia (e.g., Wikipedia). However, allowing users to create their own content can lead to vandalism or unwanted advertising, known as spam.

Systems and methods are needed to allow collaboration by users of networked computers for creating multimedia productions (for example, stories or contents) using interactive software as a platform. Further, such systems and methods enable users to collaborate over the web to create timed text for online video, while minimizing the risk of vandalism.

The invention is directed to overcoming one or more of the problems and solving one or more of the needs as set forth above.

SUMMARY OF THE INVENTION

The present invention relates generally to the field of networked computers and interactive software. More particularly it relates to allowing collaboration by users of networked computers for creating multimedia productions (for example, stories or contents) using interactive software as a platform.

To solve one or more of the problems set forth above, in an aspect of the present invention, a computer-implemented method for creating a photo story by a plurality of collaborators each capable of supplying story content over a network is provided. The method includes the steps of receiving a trigger created by a first user at a computing device associated at least with a second user, displaying on a user interface of the computing device at least a photo and a caption associated with the photo uploaded by the first user on which the photo story is to be created, enabling the second user to recommend additional data (photo or other media with caption) for and related/similar to photo and the caption to the first user, determining the context of the image and caption of the second user and publishing the combined story content as photo story game based on communications over the network to improve the engagement of the user in a platform.

In an implementation of the aspect, the first user and the second user are selected from the plurality of collaborators each capable of supplying the story content.

In an implementation of the aspect, the photo and the caption are displayed when the second user clicks on the received trigger.

In an implementation of the aspect, the selected story content being approved for inclusion in the photo story based on communications over the network by the first user or other collaborator.

In an implementation of the aspect, the story content is associated with the photo story concept.

In an implementation of the aspect, determining the context of the photo and caption of the second user using an artificial intelligence and/or image processing methods to match the context of photos with or without captions of the first user, and to arrange in an order to create a story.

In an implementation of the aspect, the method can include the further steps of initiating a total activation time (TAT) for receiving story content over the network from the plurality of collaborators starts when the second user clicks on the received trigger.

In an implementation of the aspect, the method can include the further steps of initiating a total activation time (TAT) pre-define by the first user, for receiving story content over the network from the plurality of collaborators starts when the second user clicks on the received trigger In an implementation of the aspect, the additional data comprises one or more new photos and one or more new captions in addition to the new or existing photo and the caption.

In an implementation of the aspect, the method can include the further steps of conducting online voting on the published photo story over the network; or rate the story content by the first user and/or by other collaborator.

In an implementation, interesting post or most rated or most voted story collaborator will win virtual rewards or medals.

In an implementation of the aspect, the method can include the further steps of deleting story contents by the first user and/or by other collaborator.

In an implementation of the aspect, the method can include the further steps of notifying the first user of the change suggested by the second user, wherein the notifying comprises sending an email, a SMS message, or a chat message.

In an implementation of the aspect, the method can include the further steps of triggering the second user from the plurality of collaborators to participate or collaborate, wherein the triggering comprises sending an email, a notification, a SMS message, or a chat message.

In an implementation of the aspect, the trigger is selected from an email, a SMS message, an IVR call or a chat message.

In an implementation of the aspect, the method can include the further steps of enabling the second user to perform at least one of: like the photo and the caption, view the photo and the caption, share the photo and the caption, follow the first user, comment on the photo and the caption, report on the photo and the caption, edit the additional data, delete the additional data, and report on the first user.

In an implementation of the aspect, the method can include the further steps of publishing the story for viewing over the network.

In an implementation of the aspect, the recommend additional data received from the second user of the plurality of collaborators is of a different type than the photo and the caption received from the first user of the plurality of collaborators.

In an implementation of the aspect, the method can include the further steps of determining a reward for each of the plurality of collaborators submitting the selected story content.

In another aspect of the present invention, a computer device for creating a photo story by a plurality of collaborators each capable of supplying story content over a network is provided. The system includes a processor, and a memory storing data including data records of the plurality of collaborators, wherein the processor is configured to receive a trigger created by a first user at a computing device associated at least with a second user, display on a user interface of the computing device at least a photo and a caption associated with the photo uploaded by the first user on which the photo story is to be created, enable the second user to recommend additional data for the photo and the caption to the first user, determine a selected story content from the recommended additional data submitted by the second user, and the selected story content being approved for inclusion in the photo story based on communications over the network.

In an implementation of the aspect, the first user and the second user are selected from the plurality of collaborators each capable of supplying the story content.

In an implementation of the aspect, the photo and the caption are displayed when the second user clicks on the received trigger.

In an implementation of the aspect, the selected story content being approved for inclusion in the photo story based on communications over the network.

In an implementation of the aspect, the story content is associated with the photo story concept.

In an implementation of the aspect, the processor can be further configured to initiate a total activation time (TAT) for receiving story content over the network from the plurality of collaborators starts when the second user clicks on the received trigger.

In an implementation of the aspect, the processor can be further configured to initiate a total activation time (TAT) pre-define by the first user, for receiving story content over the network from the plurality of collaborators starts when the second user clicks on the received trigger In an implementation of the aspect, the additional data comprises one or more new photos and one or more new captions in addition to the photo and the caption.

In an implementation of the aspect, the processor can be further configured to determine of the selected story content is conducted by online voting conducted over the network; or determining of the selected story content is conducted by the first user.

In an implementation of the aspect, the processor can be further configured to delete remaining story content other than the determined story content In an implementation of the aspect, the processor can be further configured to notify the first user of the change suggested by the second user, wherein the notifying comprises sending an email, a SMS message, or a chat message.

In an implementation of the aspect, the trigger is selected from an email, a SMS message, an IVR call or a chat message.

In an implementation of the aspect, the processor can be further configured to enable the second user to perform at least one of: like the photo and the caption, view the photo and the caption, share the photo and the caption, follow the first user, comment on the photo and the caption, report on the photo and the caption, edit the additional data, delete the additional data, and report on the first user.

In an implementation of the aspect, the processor can be further configured to publish the story for viewing over the network.

In an implementation of the aspect, the recommend additional data received from the second user of the plurality of collaborators is of a different type than the photo and the caption received from the first user of the plurality of collaborators.

In an implementation of the aspect, the processor can be further configured to determine a reward for each of the plurality of collaborators submitting the selected story content.

In yet another aspect, a computer-readable medium containing instructions to configure a processor to perform a method for creating a photo story by a plurality of collaborators each capable of supplying story content over a network is provided. The method comprising receiving a trigger created by a first user at a computing device associated at least with a second user, wherein the first user and the second user are selected from the plurality of collaborators each capable of supplying the story content; displaying, on a user interface of the computing device, at least a photo and a caption associated with the photo uploaded by the first user on which the photo story is to be created, the photo and the caption are displayed when the second user clicks on the received trigger; enabling the second user to recommend additional data for the photo and the caption to the first user;

determining a selected story content from the recommended additional data submitted by the second user, the selected story content being approved for inclusion in the photo story based on communications over the network; creating the photo story from the selected story content that is approved.

As compared to the conventional solutions, the present invention is technically advanced as it enables a gaming like scenario to a group of users where they can cleverly and playfully continue their connection's photo stories by adding photos and captions. It promotes an active and social play within professional world. The present invention promotes a socializing activity among professionals without interfering professional work. This is a fun game with lesser energy and time consumption. This can be used/played by all walks of professional life.

It is briefly noted that upon a reading this disclosure, those skilled in the art will recognize various means for carrying out these intended features of the invention. As such it is to be understood that other methods, applications and systems adapted to the task may be configured to carry out these features and are therefore considered to be within the scope and intent of the present invention, and are anticipated. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention. As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

The summary of the invention does not necessarily disclose all the features essential for defining the invention. The invention may reside in a sub-combination of the disclosed features. The various combination and sub-combination are fully described in the detailed description.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

The diagrams are for illustration only, which thus is not a limitation of the present disclosure, and wherein.

DETAILED DESCRIPTION OF DRAWINGS

Figure 1A:
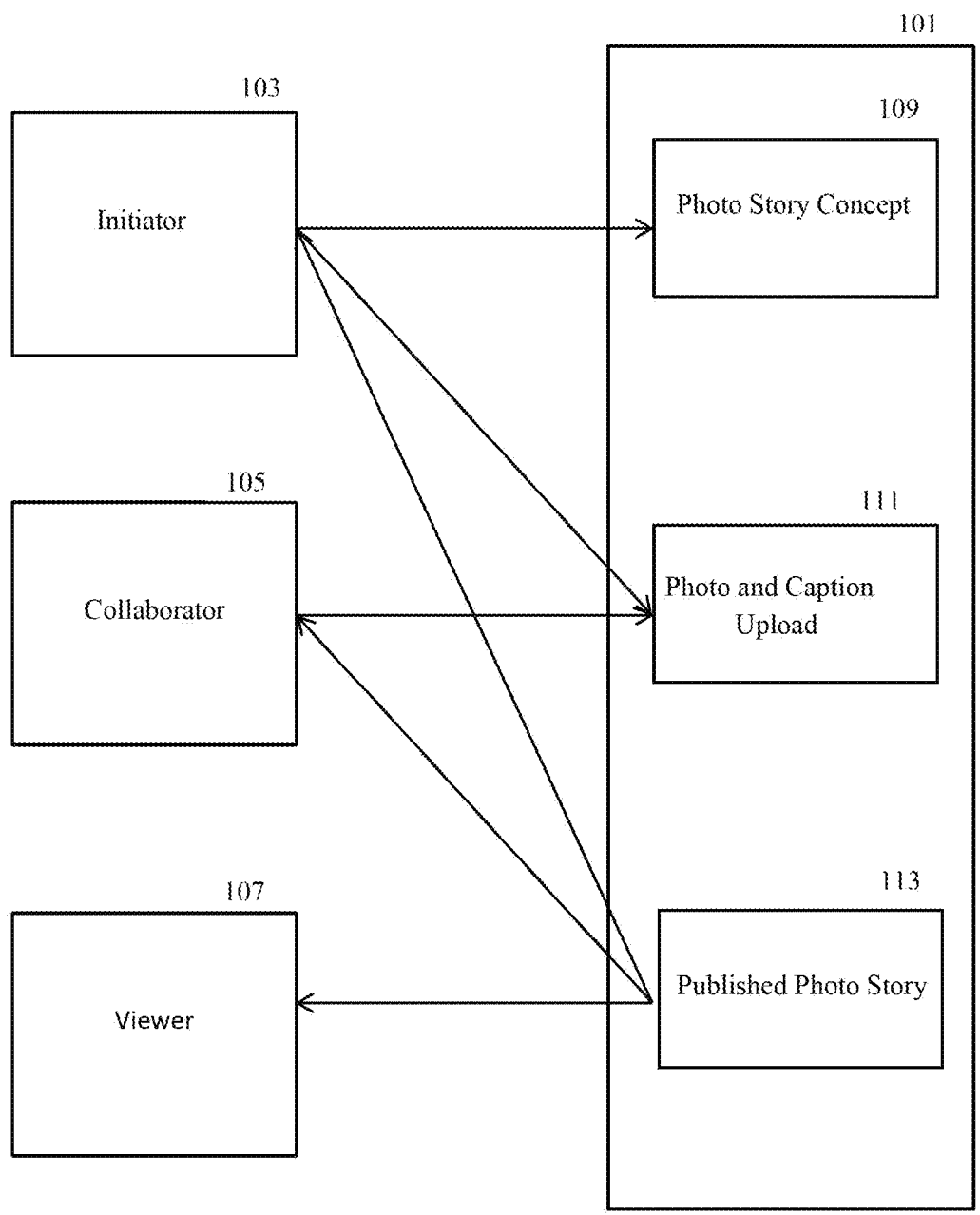
FIGS. 1A-1C is diagrams illustrating an overview of the operation of an embodiment of an online collaborative story system and a computer environment suitable for practicing the invention.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure.

In the following description, numerous specific details are set forth in order to provide a thorough understanding of embodiments of the present invention. It will be apparent to one skilled in the art that embodiments of the present invention may be practiced without some of these specific details.

Various terms as used herein are shown below. To the extent a term used, it should be given the broadest definition persons in the pertinent art have given that term as reflected in printed publications and issued patents at the time of filing.

The present invention relates generally to the field of networked computers and interactive software. More particularly it relates to allowing collaboration by users of networked computers for creating multimedia productions (for example, stories or contents) using interactive software as a platform.

An implementation of the present invention may be embodied in hardware and/or in software (including firmware, resident software, micro-code, etc.). Furthermore, the present invention may take the form of one or more computer program products on one or more computer-usable or computer-readable storage media having computer-usable or computer-readable program code embodied in the media for use by or in connection with an instruction execution system. A computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific non-limiting examples (a non-exhaustive list) of a computer-readable medium include random access memory (RAM), a read-only memory (ROM), an erasable programmable read-only memory (EPROM or Flash memory), a hard disk drive, a solid state drive, a portable compact disc read-only memory (CD-ROM), a Blu-ray disc (BD).

Computer program code or "code" for carrying out operations (e.g., steps) according to the present invention may be written in any programming language compatible with the corresponding computing devices and operating systems. Software embodiments of the present invention do not depend on implementation with a particular programming language.

The computer program code may be provided to a processor of a general-purpose computer, special purpose computer, or other programmable computing apparatus (e.g., a phone, personal digital assistant, tablet, laptop, personal computer, or computer server) as instructions to produce a machine, such that the instructions, which execute via the processor of the computer or other programmable data processing apparatus, create means for implementing the functions specified in the illustrations. The computer code may be stored in a computer-readable memory that can direct a computer or other programmable data processing apparatus to function in a particular manner, such that the instructions stored in the computer-readable memory produce an article of manufacture including instruction means which implement the functions and perform the steps specified in the illustrations and described herein.

As compared to the conventional solutions, the present invention is technically advanced as it enables a gaming like scenario to a group of users where they can cleverly and playfully continue their connection's photo stories by adding photos and captions. It promotes an active and social play within professional world. The present invention promotes a socializing activity among professionals without interfering professional work. This is a fun game with lesser energy and time consumption. This can be used/played by all walks of professional life.

In an example, if the present invention is implemented in a gaming form, the player in such game would be the users. Such game would provide fun, playful, witty, clever, intellectual, humorous, the feeling of having fun without extending so much effort/time, a slight escape to the professional world. In-game achievements and medals, continuous engagement through likes, comments and views, fulfillment in completing story, organic curiosity, viral opportunity, etc. may keep the players engaged with the game.

The game's user interface can be clean and simple. The layout should be clean to keep the focus on the photo stories. The user interface can be simple for everyday users by using familiar navigation, buttons and layouts common in most photo and video social media (ex. Instagram, Tiktok) for easy user interface. However, it may introduce a few new steps specific for this game which will also give the game its individuality for example like its visuals, audio should be kept into minimum using default phone sounds.

Beginning with an overview of the operation of the invention, FIG. 1A illustrates one embodiment of an online collaborative story system 100. An initiator 103 submits a story concept to a collaborative story server computer 101 to be posted in a photo story concept area 109. The story concept may be in the form of a storyboard containing a sequence of scenes, a series of chapter synopsis, a set of characters and a potential plot line, a starting scene, or other type of data structure that indicates the subject matter of the story. The story concept also specifies the types of content that will be used to create the story including text, graphics, still images, video, audio and/or a mix of multimedia data types. One or more collaborators 105 choose a story concept from the story concepts area 109 and upload content appropriate for the chosen the story to the Photo and Caption Upload area 111. The uploaded content is associated with an element of the chosen story, such as a scene in a storyboard, a chapter in a book, a character, or a scene that follows an already existing scene. The initiator 103 may also act as a collaborator by uploading content to the working content area 111. The content contributed by the collaborators may be different, e.g., one collaborator may supply an image for a scene while a second collaborator provides text related to the image.

In an implementation of the aspect, the initiator, or one or more collaborators, acts as an editor to decide what portions of the uploaded content will be used in the story. When multiple collaborators act as editors, a periodic vote will be taken on the content that exists in the working content area 111. Once the story is finished, the story is posted to a published story area 113 where it may be publicly available for another other users, i.e. viewer 107. Alternatively, the finished story can be published as a private story in the published story area 113 so that only the initiator 103 and collaborators 105 can view it.

Figure 1B:
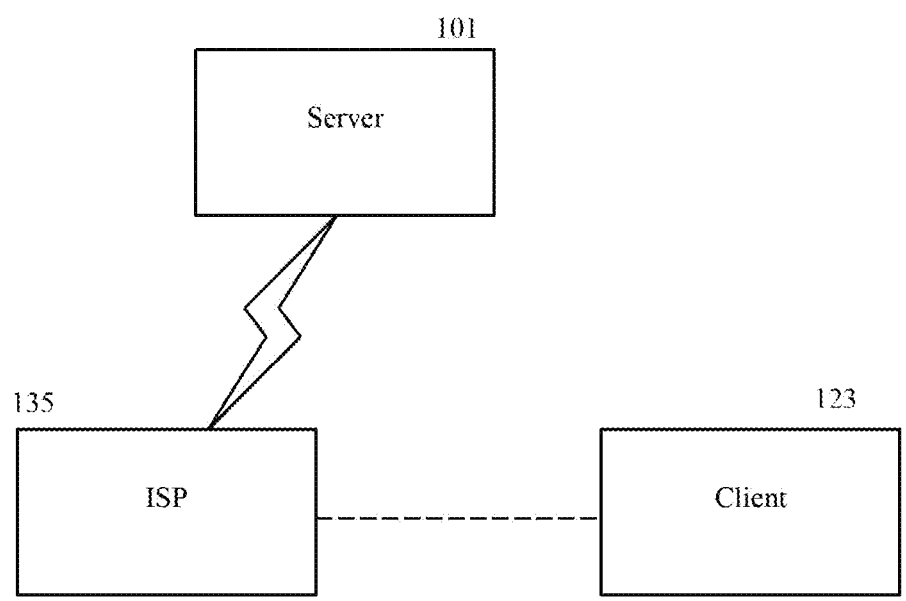

In one embodiment, as shown in FIG. 1B, the collaborative story server computer 101 hosts a collaborative story web site and is part of, or coupled to, an ISP (Internet Service Provider) 135 to provide the story content over the Internet. Client computers 123 for the initiator 103, the collaborator 105 and the viewer 107 execute a conventional Internet browsing application to exchange data with the server 101. It is readily apparent that the present invention is not limited to Internet access and Internet web-based sites; directly coupled and private networks are also contemplated. In this embodiment, an administrator of the web site may set rating criteria for story concepts and uploaded content to prevent the posting of information which may be offensive to some users.

Figure 1C:
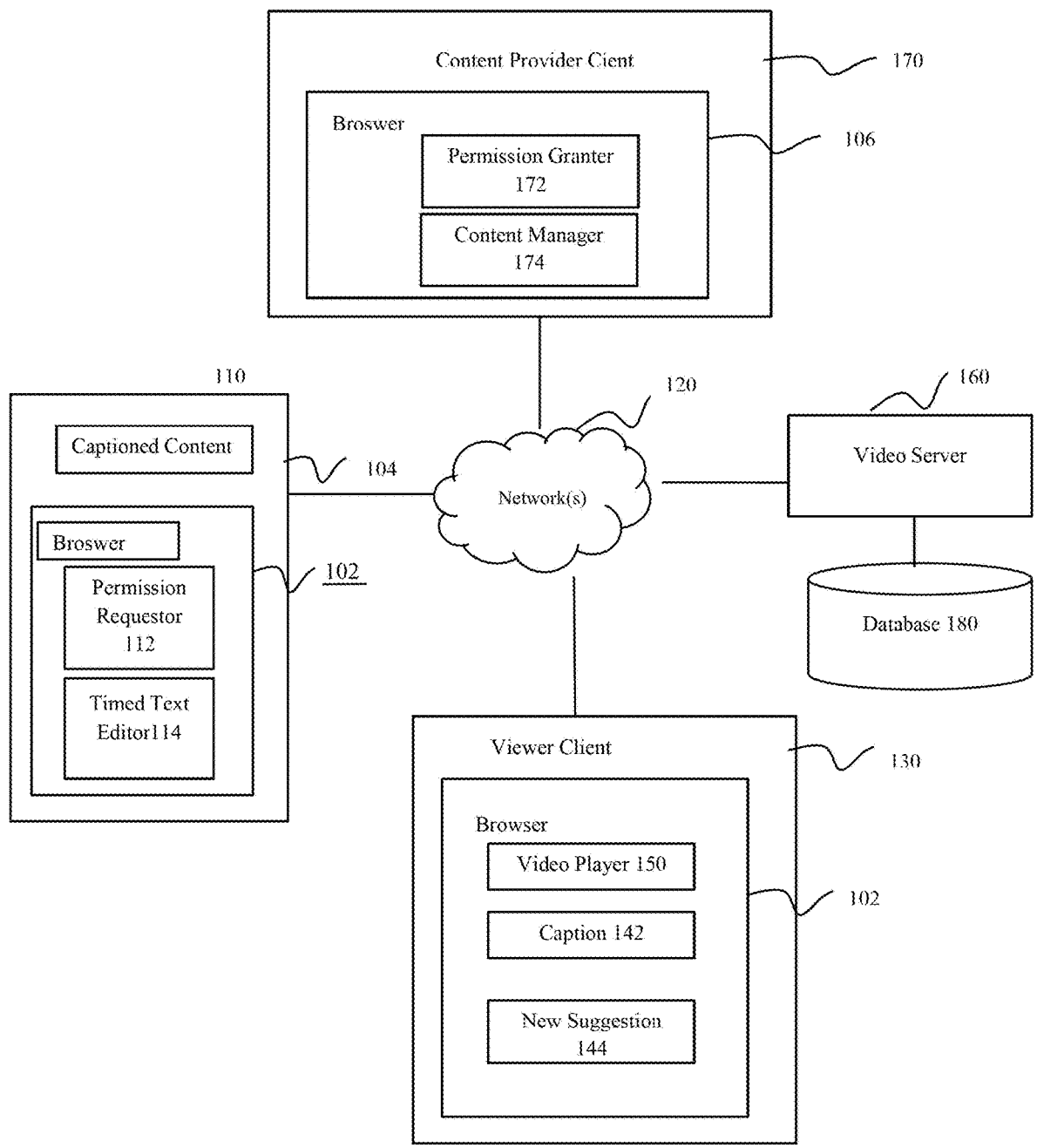

FIG. 1C is an architecture diagram of a system according to an embodiment of this invention. In this exemplary embodiment, the term "content producer" used herein refers to the individual who may upload the video. The content producer may be responsible for certain administrative functions related to the video. The term "captioner" used herein refers broadly to anyone who authors timed text other than the content producer. The term "viewer" used herein refers broadly to anyone viewing timed text that may rate or suggest changes to an online captioned video.

FIG. 1C contains a system 100 that includes a content producer client 170, an audio/video/image server 160, a viewer client 130, and a captioner client 110, all connected using one or more networks 120. Audio/video/image server 160 may be coupled to database 180.

It may be appreciated that even though this exemplary embodiment provides architecture for processing video contents as inputs, however, the same architecture may be sued for processing audio, images etc.

Audio/video/image server 160 is a server which may deliver video content along with other data to the various clients. Audio/video/image server 160 may contain a web server. A web server is a software component that responds to a hypertext transfer protocol (HTTP) request with an HTTP response. As illustrative examples, the web server may be, without limitation, Apache HTTP Server, Apache Tomcat, Microsoft Internet Information Server, JBoss Application Server, WebLogic Application Server, or Sun Java System Web Server. The web server may serve content such as hypertext markup language (HTML), extendable markup language (XML), documents, videos, images, multimedia features, MACROMEDIA Flash programs, or any combination thereof. This example is strictly illustrative and does not limit the present invention.

In an embodiment, audio/video/image server 160 may receive a user interface encoded in an HTML or FLASH file generated according to an HTTP request from a client. Audio/video/image server 160 may then send the HTML or Flash file to a client as an HTTP response. When the client receives the HTTP response, the client renders the user interface to the user. The user interface, for example, may enable the user to request permission to create timed text for the video, to grant permission to create timed text for the video, to rate the timed text, or to suggest to the timed text.

Audio/video/image server 160 also contains a credit adder 162. Credit adder 162 adds a credit to the video according to the creator of the timed text track when a new timed text track is created.

Audio/video/image server 160 may be coupled to a database 180. Database 180 may be a relational database. Database 180 may store multimedia content such as video, time text tracks, user information, or any other necessary data.

Captioner client 110 is a client enabling a captioner to create a timed text track. To create a timed text track, the captioner must first request permission from the content producer. Captioner client 110 contains a browser 104, a permission requestor 112 and a timed text editor 114. In an embodiment, browser 104 receives an HTTP response containing a file. As an example, the file may be encoded in HTML or Flash. The browser may interpret the file to instantiate a permission requestor 112 and a timed text editor 114.

Permission requestor 112 enables the user to request permission to create a timed text track. In an example, permission requestor 112 may provide a form in which the user can enter the data. When the user selects a submit button, permission requestor 112 sends the data to audio/video/image server 160. The data may include the language of the timed text track, a message to the content producer, and (optionally) a proposed price for the captioning services.

Once permission has been granted, time text editor 114 enables the captioner to create a timed text track. More information on the operation of permission requestor 112 and timed text editor 114 is provided below.

Viewer client 130 contains a browser 102, a video player 150, a timed text rater 142, and a change suggester 144. In an embodiment, browser 102 receives an HTTP response containing a file. As an example, the file may be encoded in HTML or Flash. Browser 102 may interpret the file to instantiate video player 150, timed text rater 142, and change suggester 144.

Video player 150 enables a user to play a video and a corresponding time text track. In one embodiment, video player 150 may be instantiated by a browser plug-in using a Flash file. Video player 150 may stream video to a viewer over the Internet. As a result, the viewer does not need to store the video in its entirety before playing. Video player 150 may also include various controls, for example, traditional video controls as well as controls to view a timed text track. Some controls may include buttons, dropdown menus, and other controls known in the art.

Timed text rater 142 enables a user to rate a timed text track. In an example, timed text rater 142 may present the user with a form. When the user makes a selection, timed text rater 142 sends the rating to audio/video/image server 160. Audio/video/image server 160 may then average that rating with other ratings.

Change suggester 144 enables a user to suggest changes. In an example, change suggester 144 may present the user with a form. The user may enter data and press the submit button. More information on the operation of video player 150, timed text rater 142, and change suggester 144 is provided below.

Content producer client 170 contains a browser 106, a permission granter 172, and a content manager 174. In an embodiment, browser 106 receives an HTTP response containing a file. As an example, the file may be encoded in HTML or Flash. Browser 106 may interpret the file to instantiate permission granter 172 or content manager 174. Permission granter 172 enables a content producer to grant permission to a captioner to add timed text. Content manager 174 enables a content producer to disable the permission requester for a particular video. More information about the operation of permission granter 172 and content manager 174 is provided below.

By requiring permission from a content producer before the captioner can add a caption, system 100 enables users to collaborate over the web to create timed text for online video, while minimizing the risk of vandalism. This collaboration fosters the creation of additional high-quality timed text for online video.

Each of content producer client 170, audio/video/image server 160, viewer client 130, captioner client 110 may be implemented on any computing device that can communicate over a network. Examples of a computing device include, but are not limited to, a computer, workstation, distributing computing system, embedded system, standalone electronic device, network device, local device, rack server, television, or other type of computer system. A computing device may also include a user interface. The user interface may include a user interface display and an input device. As an illustrative example, the user interface display may be a computer screen. The input device may include a mouse that allows the user to make a selection on the user interface display. In another example, the user interface may allow the user to make a selection using a keyboard or touch screen. These examples are merely illustrative and are not intended to limit the invention.

Network 120 can be any network or combination of networks that can carry data communication. Such network 120 can include, but is not limited to, a local area network, medium area network, and/or wide area network such as the Internet. Network 120 can support protocols and technology including, but not limited to, World Wide Web protocols and/or services. Intermediate web servers, gateways, or other servers may be provided between components of system 100 depending upon a particular application or environment.

Each of video player 150, timed text rater 142, change suggester 144, permission requestor 112, timed text editor 114, permission granter 172, content manager 174 and browsers 102, 104, and 106 may be implemented in hardware, software, firmware or any combination thereof.

Figure 2:
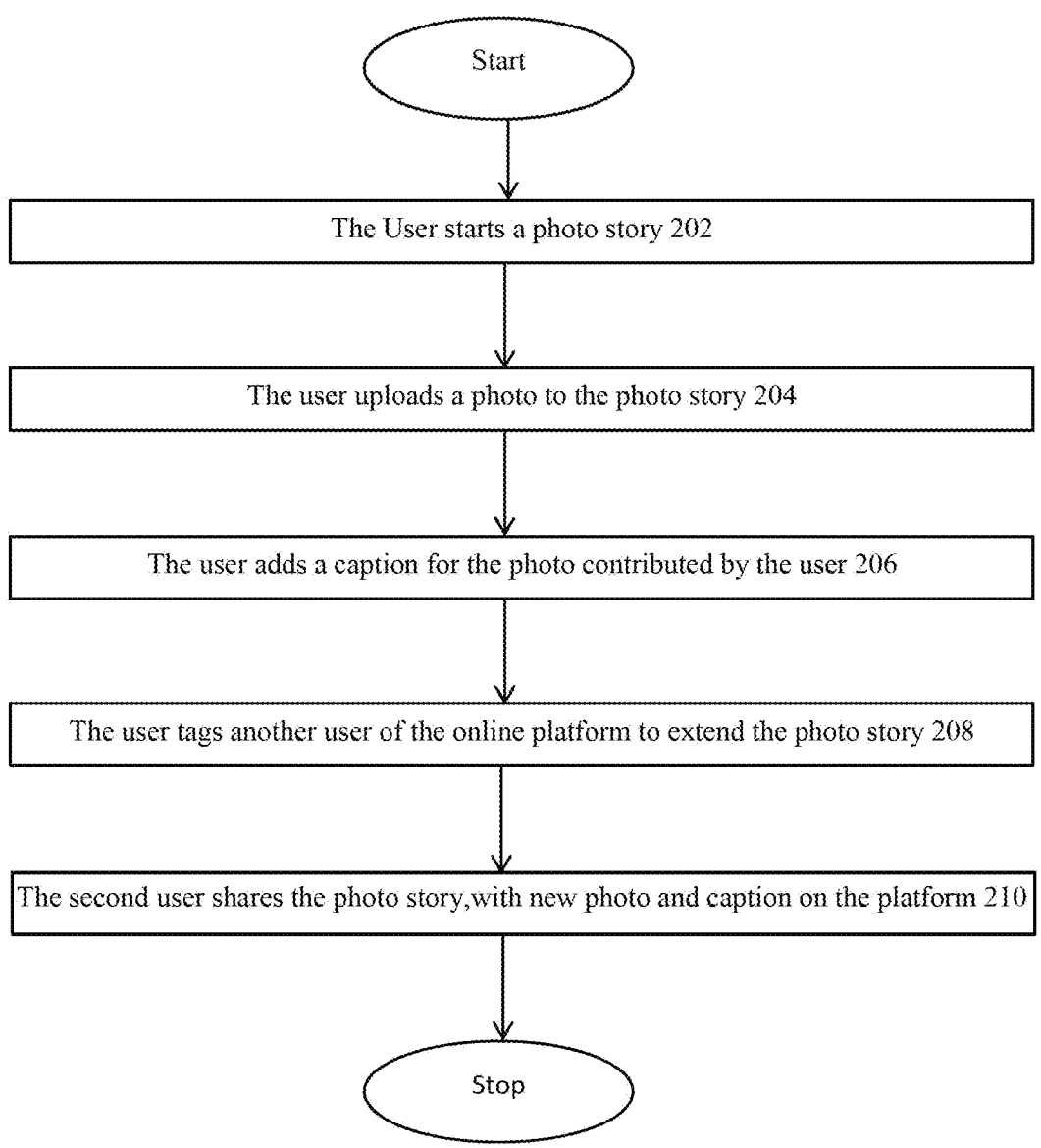
FIG. 2 illustrates a flowchart showing a method for creating a photo story by a user over a network according to an embodiment of the invention.

FIG. 2 illustrates a flowchart showing a method for creating a photo story by a user over a network according to an embodiment of the invention.

In an embodiment, a computer-implemented method for creating a photo story by a user over a network is provided.

At step 202, a user starts a photo story.

At step 204, the user uploads a photo to the photo story.

At step 206, the user adds a caption for the photo contributed by the user.

At step 208, the user tags another user of the online platform to extent the photo story.

At Step 210, the second user shares the photo story, with new photo and caption on the platform updated photo contribution on the platform.

FIGS. 3A-3D shows an exemplary game/story building illustration in accordance with a working example of an embodiment of the invention. As can be seen from the FIGS. 3A-3D, the initiator looks in their photos and chooses one to start a story that goes with the photo.

Figure 3A:
FIGS. 3A-3D illustrates an exemplary game/photo story building illustration in accordance with a working example of an embodiment of the invention.

For example, a person/user 1 can submit an image of FIG. 3A with a caption "Once upon a time there were 2 birds . . . ." Then he/she challenges their network to add a photo and text to continue the story.

Figure 3B:
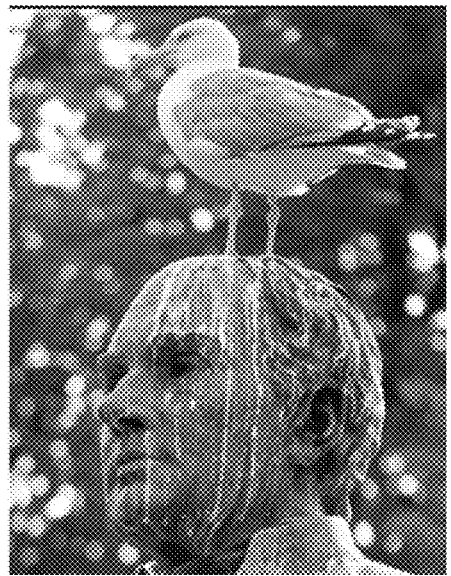
Figure 3C:
Figure 3D:

By seeing image of FIG. 3A, a person/user 2 can input a new image as shown in FIG. 3B and add to the content as "They had a friend who wasn't polite . . . " By seeing image of FIGS. 3A & 3B, a person/user 3 can input a new image as shown in FIG. 3C and add to the it a content as "And one with a big mouth LOL! . . . ". By seeing image of FIGS. 3A-3C, a person/user 4 can input a new image as shown in FIG. 3D and add to it a content as "They had a party." The initiator or user/person 1 who posted the first image can then end the timer/story and compile all the comments and images to form his story.

FIGS. 4A-4I shows some exemplary user interfaces consistent with certain embodiments of the invention.

Figure 4A:
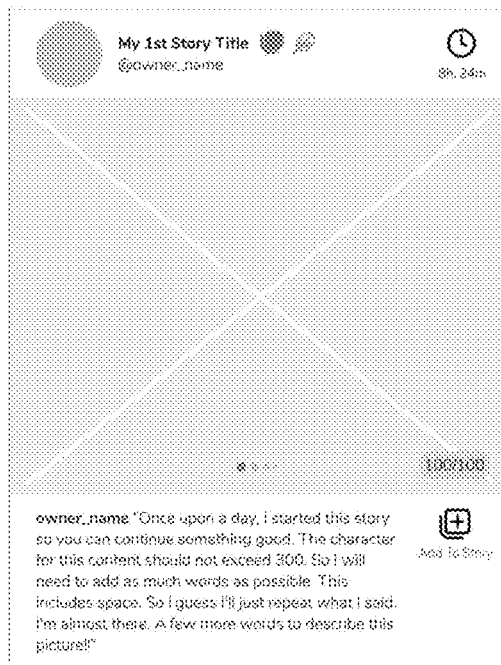
FIGS. 4A-4I illustrates some exemplary user interfaces consistent with certain embodiments of the invention.

To keep the game engaging, we'll be introducing achievement medals/awards on the following (initial) feats:
Individual success
  no. of stories initiated
  no. of successful stories
  no. of contributed stories
Public success
  Most Liked posts
  Most Viewed stories
  Most Followed stories Comments and Follows should contribute to organic engagement. Introduction of theme selections and Special Admin Events/Stories/Challenges should contribute as "push" events that will trigger/help users to get going in the game.
  Interactivity:
  i. Roles—a user can be any of the following at any point in time depending on what he is doing.
    a. Initiator—user who starts a story
    b. Contributor—user who adds to a story
    c. Viewer—users who Like, View, Follow, Comment and Report A Post ii. Social Interactions
  a. Start a Story
  b. Add to Story
  c. Like
  d. View
  e. Follow
  f. Comment
  g. Report a Post
iii. Status—a photo story can be:
  a. On-going—a story is still active and can be contributed upon
  b. Ended—a story has ended and can't be contributed upon.
Gameplay:
i. The user will be greeted by a brief How-to-play which can be turned off (Don't show again) by already accustomed users.
ii. The user can check out On-going (green) and Ended (red) stories within his connection circle.
iii. The user can select to contribute or Add to Story to On-going stories or initiate his own story or Start a Story.
iv. A Story can consist of several Posts.
v. A Post contains a Photo and a Caption of up to 300 characters.
vi. A story life can have up to 100 max photo/posts. Story Counter determines a successful story.
vii. A story life can end when it becomes a successful story by having 100/100 Story Counter or if its Next Post Timer ends. A 16 hours Next Post Timer is triggered after every post.
viii. The user can View, Like, Follow, Comment and Report a Post.
ix. A user can tag another connection to his post to trigger a direct notification of the story/post to the tagged user
x. A View count is only triggered when a user scrolls through all the posts in a story
xi. A user saves a story in his archive when he Follows a story
xii. A user can view an archive of his initiated stories and achievement medals in his Profile In an exemplary embodiment, as shown in FIG. 4A, the user interface of the present invention may show a "Story Block" page which may be an infinite horizontal scroll of all user's connections' stories. Story Block contains the following items:
  1. Profile pic and name of story owner
  2. Title of the Story
  3. On-going and Ended sign
  4. owned (blue quill) and contributed (grey quill) sign
  5. Next Post Timer determines the time a user can add to a story
  6. Story Post Preview (up to 4 most recent posts only)
  7. Story Counter (100/100)—determines the number of photos/posts inside a story
  8. Post Caption
  9. Add to Story Button—opens up the post widget (see Start A Story).

Figure 4B:
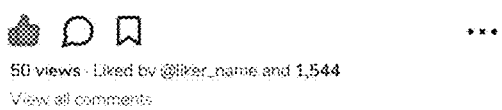
Figure 4C:
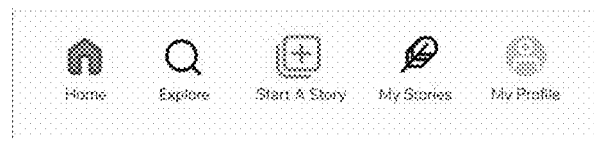
Figure 4D:
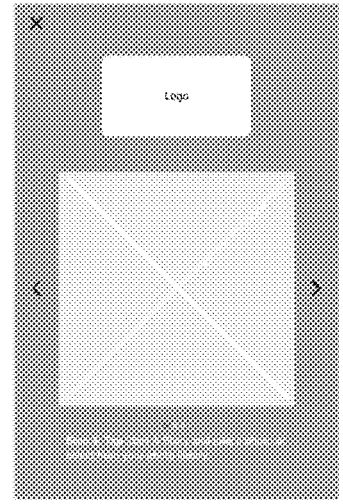
Figure 4E:
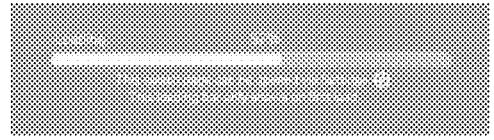

In an exemplary embodiment, as shown in FIG. 4B, the user interface of the present invention may show "Social Area" which may include following options:
  Like
  Comment
  Follow
  More (3 dots) to open the
  device's default Report a Post pull up menu.
  No. of Views, connected Liker and Likes
  View all comments list In an exemplary embodiment, as shown in FIG. 4C, the user interface of the present invention may show "Main Navigation" Located and locked at the bottom area. Contains the major buttons to the main pages can include:
   a. Home—brings user to the Home/Dashboard page
   b. Explore—brings user to Explore/Search page
   c. Start A Story—opens the Start A Story page for starting a new story
   d. My Stories—brings user to a page where all his owned and contributed stories are listed.
   e. My Profile—brings user to his Profile page In an exemplary embodiment, as shown in FIG. 4D, the user interface of the present invention may show "Splash/Loading Page" that contains the Logo, Game's How To Instructions and (on initial load) the Loading Bar as shown in FIG. 4E. This can be triggered anytime without the loading bar from Settings area.

Figure 4F:
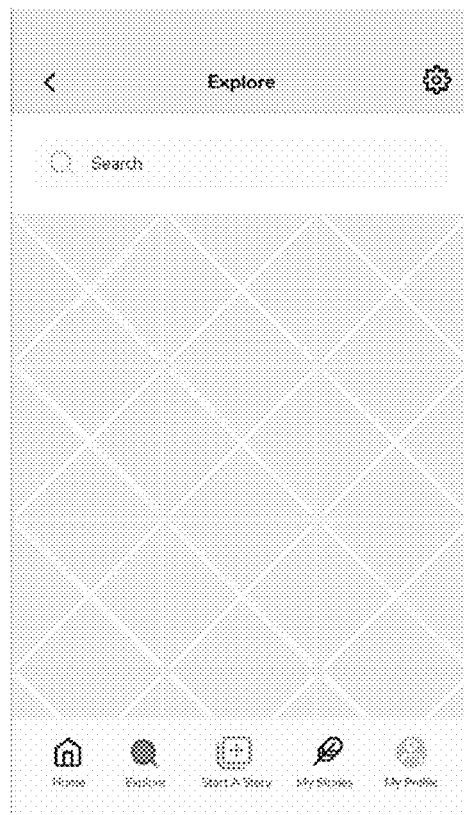

In an exemplary embodiment, as shown in FIG. 4F, the user interface of the present invention may show "Explore Page" that contains a grid view of public stories thumbnails and a search bar. The Header and Main Navigation are locked on top and bottom areas, respectively. A Back button (<) is added in the header area and the Logo is replaced with the page name (Explore).

Figure 4G:
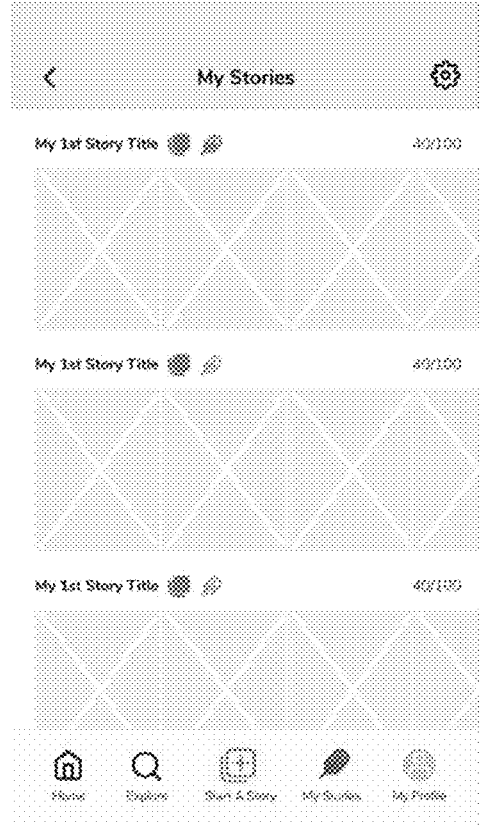

In an exemplary embodiment, as shown in FIG. 4G, the user interface of the present invention may show "My Stories" that contains a list view of the user's own, contributed and followed stories with the most recent on top. A list item contains the story's up to 8 thumbnails of the most recent posts that can be strolled horizontally. The Header and Main Navigation are locked on top and bottom areas, respectively. A Back button (<) is added in the header area and the Logo is replaced with the page name (Explore).

Figure 4H:
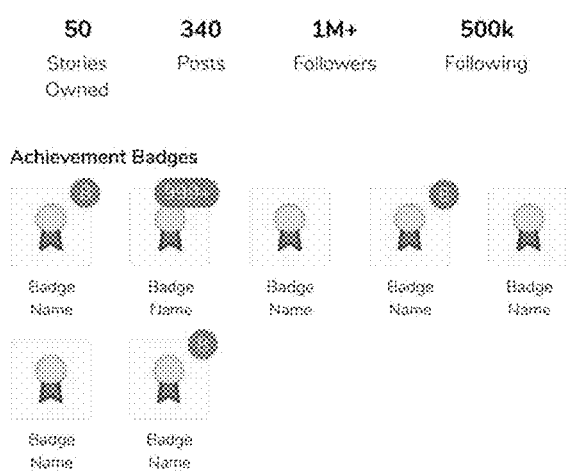
Figure 4I:
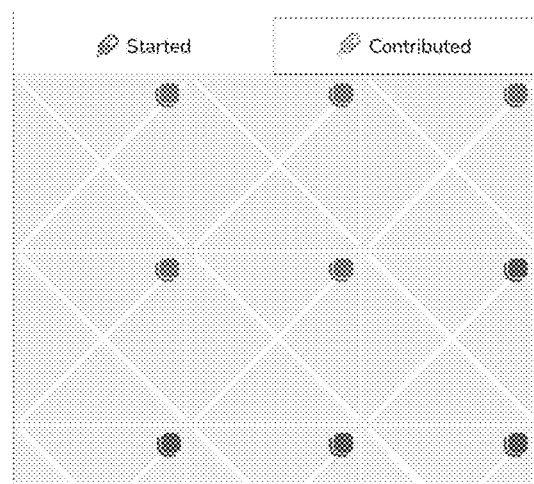

In an exemplary embodiment, as shown in FIG. 4H, the user interface of the present invention may show "My Profile" which contains the user's social achievements—No. of stories owned, posts, and followers and following. Followed by the user's personal achievements badges. A counter is added in the badge to denote the number of times the achievement was met. The last part of My Profile page features two tabs—the user's Started and Contributed stories. Each tab contains grid views of story thumbnails as shown in FIG. 4I. The Header and Main Navigation are locked on top and bottom areas, respectively. A Back button (<) is added in the header area and the Logo is replaced with the page name (Explore).

In an exemplary working, to start a story creation,
Step 1: start A story button opens up the post widget.
   Step 1a: The first page contains a header where a user can edit the title (title is not editable in Add To story). The header also contains a Cancel button to cancel starting/adding a post and Next button to continue processing the post. 75% of the screen shows the camera view/photo view. Followed by the Capture and Library buttons.
   Step 1b: If the user decides to select from his photo library, he can tap/click on the Library button to open up the library pull up to show his photos. Once a photo is selected, the pull up closes and the user can tap on Next to continue.
Step 2: This is where a user can edit his photo manually or via filter.
Step 3: The final page of the post widget is where a user can add his brief story/post caption. The character counter is placed under the post thumbnail. A user can select to tag a friend/connect; show post in private/public; allow comments and save the post to his device A big Post button is locked at the bottom for easier user posting.

Figure 5:
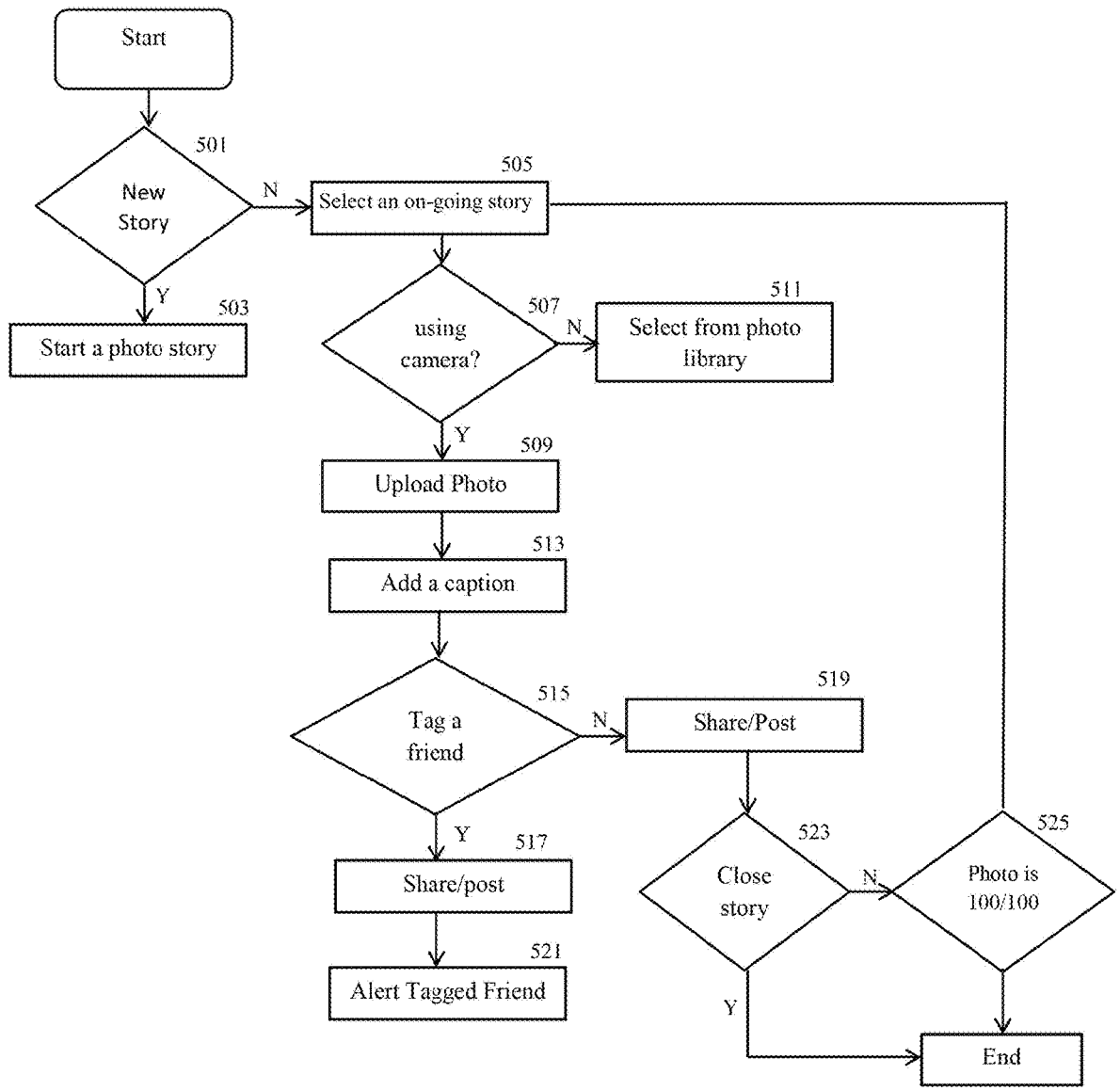
FIG. 5 illustrates a flowchart showing an exemplary game/story building illustration in accordance with a working example of an embodiment of the invention.

FIG. 5 shows a flowchart showing an exemplary game/story building illustration in accordance with a working example of an embodiment of the invention.

As shown in FIG. 5, the initiator of the first user at step 501 can start creating story. At step 503 the initiator may choose to start creating a new story or at step 505 the initiator may decide to continue the ongoing story.

At step 507, the initiator may decide if a live story for a live photo is to be created at step 509 or a story associated with any past event photo is to be created as step 511. Once the photo either form 509 or 511 is uploaded, the initiator may add captions to the same at step 513. At the same time he may decide if any friend is to be tagged in such photo or contents at step 515.

Once the post is shared at step 519 and 521 and alert is shared with the connection. Also if any friend is tagged an alert to such tagged friend is also shared at step 521.

Along with such sharing of post at steps 519/521, a timer associated with the post also starts at step 523. Once the timer ends, all the comments and posts form the peers/users are shared with the initiator at step 525 to ultimately compile the story by accepting the comments or rejecting them.

When a collaborator chooses a story concept to contribute to, the server executes an upload content method to post the uploaded content in the working content area. The server computer receives an identifier from the collaborator that defines a story concept and an element within the concept and receives the associated content The method optionally determines if the content is acceptable in light of the standards set by the site administrator, and deletes the content from server if the content is not. Otherwise, the content is posted in the working content area and the editor(s) for the story concept are notified of the new content at block. Upon receipt of the notification, the editor(s) send their votes on the new posted content to the collaborative story server.

Figure 6:
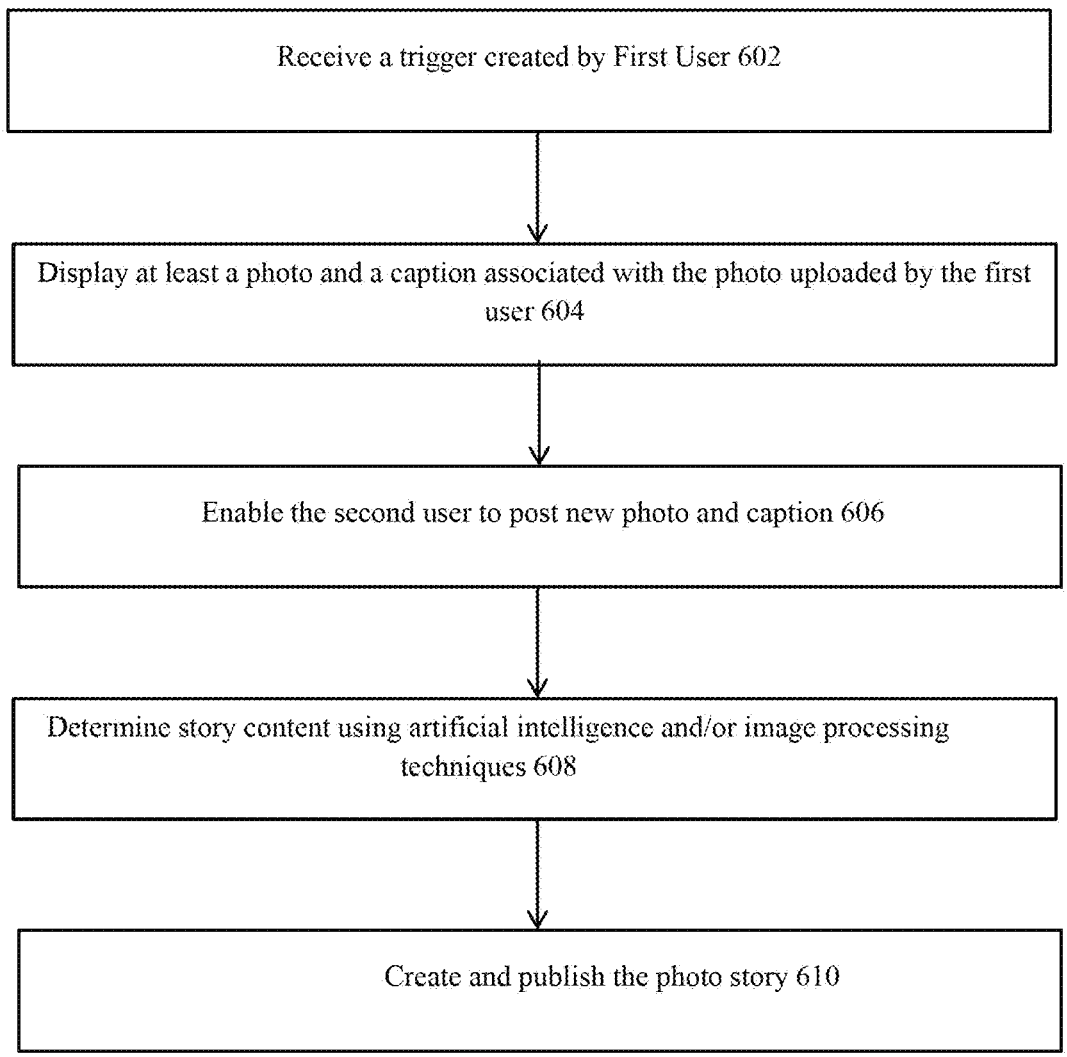
FIG. 6 illustrates a flowchart showing a method for creating a photo story by a plurality of collaborators each capable of supplying story content over a network according to an embodiment of the invention.

FIG. 6 shows a flowchart showing a method for creating a photo story by a plurality of collaborators each capable of supplying story content over a network according to an embodiment of the invention.

In an embodiment, a computer-implemented method for creating a photo story by a plurality of collaborators each capable of supplying story content over a network is provided.

At step 602, a trigger created by a first user is received at a computing device associated at least with a second user.

At step 604, at least a photo and a caption associated with the photo uploaded by the first user on which the photo story is to be created is displayed on a user interface of the computing device.

At step 606, the second user is enabled to post new photo and caption.

At step 608, determine the story content using artificial intelligence and/or image processing techniques or methods.

At step 610, the selected photo story created and published on communications over the network.

In an exemplary embodiment, the first user and the second user are selected from the plurality of collaborators each capable of supplying the story content.

In an exemplary embodiment, the photo and the caption are displayed when the second user clicks on the received trigger.

In an exemplary embodiment, the selected story content being approved for inclusion in the photo story based on communications over the network.

In an exemplary embodiment, the story content is associated with the photo story concept.

In an exemplary embodiment, the method can include the further steps of initiating a total activation time (TAT) for receiving story content over the network from the plurality of collaborators starts when the second user clicks on the received trigger.

In an exemplary embodiment, the method can include the further steps of initiating a total activation time (TAT) pre-define by the first user, for receiving story content over the network from the plurality of collaborators starts when the second user clicks on the received trigger In an exemplary embodiment, the additional data comprises one or more new photos and one or more new captions in addition to the photo and the caption.

In an exemplary embodiment, the method can include the further steps of determining of the selected story content is conducted by online voting conducted over the network; or determining of the selected story content is conducted by the first user.

In an exemplary embodiment, the method can include the further steps of deleting remaining story content other than the determined story content In an exemplary embodiment, the method can include the further steps of notifying the first user of the change suggested by the second user, wherein the notifying comprises sending an email, a SMS message, or a chat message.

In an exemplary embodiment, the trigger is selected from an email, a SMS message, an IVR call or a chat message.

In an exemplary embodiment, the method can include the further steps of enabling the second user to perform at least one of: like the photo and the caption, view the photo and the caption, share the photo and the caption, follow the first user, comment on the photo and the caption, report on the photo and the caption, edit the additional data, delete the additional data, and report on the first user.

In an exemplary embodiment, the method can include the further steps of publishing the story for viewing over the network.

In an exemplary embodiment, the recommend additional data received from the second user of the plurality of collaborators is of a different type than the photo and the caption received from the first user of the plurality of collaborators.

In an exemplary embodiment, the method can include the further steps of determining a reward for each of the plurality of collaborators submitting the selected story content.

In another embodiment, a computer device for creating a photo story by a plurality of collaborators each capable of supplying story content over a network is provided. The system includes a processor, and a memory storing data including data records of the plurality of collaborators, wherein the processor is configured to receive a trigger created by a first user at a computing device associated at least with a second user, display on a user interface of the computing device at least a photo and a caption associated with the photo uploaded by the first user on which the photo story is to be created, enable the second user to recommend additional data for the photo and the caption to the first user, determine a selected story content from the recommended additional data submitted by the second user, and the selected story content being approved for inclusion in the photo story based on communications over the network.

In an exemplary embodiment, the first user and the second user are selected from the plurality of collaborators each capable of supplying the story content.

In an exemplary embodiment, the photo and the caption are displayed when the second user clicks on the received trigger.

In an exemplary embodiment, the selected story content being approved for inclusion in the photo story based on communications over the network.

In an exemplary embodiment, the story content is associated with the photo story concept.

In an exemplary embodiment, the processor can be further configured to initiate a total activation time (TAT) for receiving story content over the network from the plurality of collaborators starts when the second user clicks on the received trigger.

In an exemplary embodiment, the processor can be further configured to initiate a total activation time (TAT) pre-define by the first user, for receiving story content over the network from the plurality of collaborators starts when the second user clicks on the received trigger In an exemplary embodiment, the additional data comprises one or more new photos and one or more new captions in addition to the photo and the caption.

In an exemplary embodiment, the processor can be further configured to determine of the selected story content is conducted by online voting conducted over the network; or determining of the selected story content is conducted by the first user.

In an exemplary embodiment, the processor can be further configured to delete remaining story content other than the determined story content In an exemplary embodiment, the processor can be further configured to notify the first user of the change suggested by the second user, wherein the notifying comprises sending an email, a SMS message, or a chat message.

In an exemplary embodiment the trigger is selected from an email, a SMS message, an IVR call or a chat message.

In an exemplary embodiment, the processor can be further configured to enable the second user to perform at least one of like the photo and the caption, view the photo and the caption, share the photo and the caption, follow the first user, comment on the photo and the caption, report on the photo and the caption, edit the additional data, delete the additional data, and report on the first user.

In an exemplary embodiment, the processor can be further configured to publish the story for viewing over the network.

In an exemplary embodiment, the recommend additional data received from the second user of the plurality of collaborators is of a different type than the photo and the caption received from the first user of the plurality of collaborators.

In an exemplary embodiment, the processor can be further configured to determine a reward for each of the plurality of collaborators submitting the selected story content.

In another embodiment, a computer-readable medium containing instructions to configure a processor to perform a method for creating a photo story by a plurality of collaborators each capable of supplying story content over a network is provided. The method comprising receiving a trigger created by a first user at a computing device associated at least with a second user, wherein the first user and the second user are selected from the plurality of collaborators each capable of supplying the story content; displaying, on a user interface of the computing device, at least a photo and a caption associated with the photo uploaded by the first user on which the photo story is to be created, the photo and the caption are displayed when the second user clicks on the received trigger; enabling the second user to recommend additional data for the photo and the caption to the first user; determining a selected story content from the recommended additional data submitted by the second user, the selected story content being approved for inclusion in the photo story based on communications over the network; creating the photo story from the selected story content that is approved.

Figure 7:
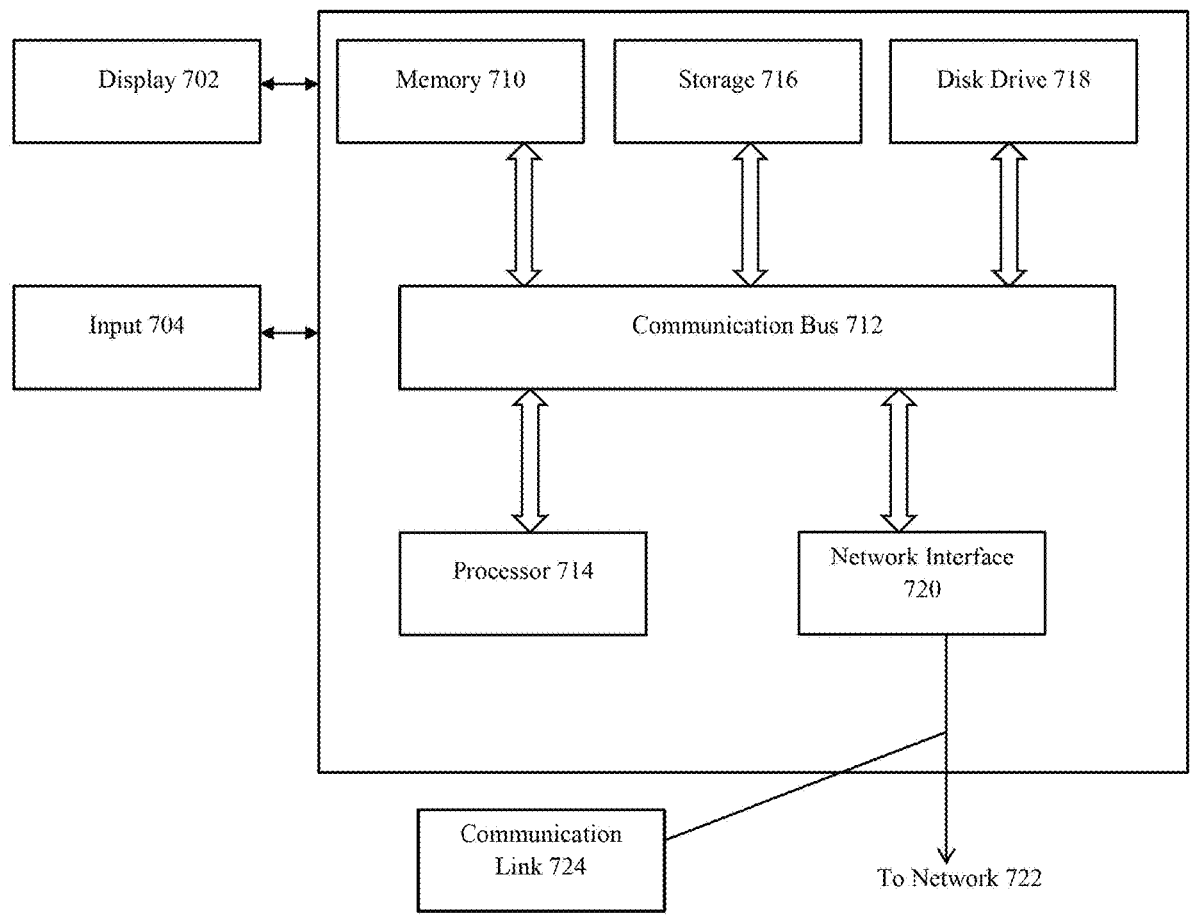
FIG. 7 illustrates a block diagram of a system according to an embodiment of the invention.

FIG. 7 shows a block diagram of a system according to an embodiment of the invention. FIG. 7 is a block diagram of a computer system suitable for implementing one or more embodiments of the present disclosure, including the mobile device 120, merchant server 130, and the service provider server 180. In various implementations, the mobile device 120 may include a mobile cellular phone, personal computer (PC), laptop, wearable computing device, etc. adapted for wireless communication, and the merchant server 130 and service provider server 180 may comprise a network computing device, such as a server. Thus, it should be appreciated that the devices 120, 130, and 180 may be implemented as computer system in a manner as follows.

Computer system includes a bus 712 or other communication mechanism for communicating information data, signals, and information between various components of computer system. Components include an input/output (I/O) component 704 that processes a user (e.g., sender, recipient, service provider) action, such as selecting keys from a keypad/keyboard, selecting one or more buttons or links, etc., and sends a corresponding signal to bus 712. I/O component 704 includes an input control 704 (such as a keyboard, keypad, mouse, etc.) and also include an output component, such as a display 702 and a An optional audio input/output component 706 may also be included to allow a user to use voice for inputting information by converting audio signals. Audio I/O component may allow the user to hear or record audio. A transceiver or network interface 720 transmits and receives signals between computer system and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on computer system or transmission to other devices via a communication link 724. Processor 714 may also control transmission of information, such as cookies or IP addresses, to other devices.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system. In various other embodiments of the present disclosure, a plurality of computer systems coupled by communication link 424 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A computer-implemented method for creating a photo story by a plurality of collaborators each capable of supplying story content over a network, the computer-implemented method comprising:

receiving, at a computing device associated at least with a second user, a trigger created by a first user, wherein the first user and the second user are selected from the plurality of collaborators each capable of supplying the story content;

displaying, on a user interface of the computing device associated at least with the second user, at least a first photo, and a first caption associated with the first photo, uploaded by the first user, the first photo and the first caption are displayed when the second user clicks on the received trigger;

initiating, by the computing device, a total activation time (TAT) for receiving story the story content over the network from the plurality of collaborators, which starts when the second user clicks on the received trigger; or initiating, by the computing device, a total activation time (TAT) pre-defined by the first user, for receiving the story content over the network from the plurality of collaborators, which starts when the second user clicks on the received trigger; and enabling, by the computing device, the plurality of collaborator to post new photos, and new captions associated with the new photos, which are related to the first photo and first caption uploaded by the first user;

using an artificial intelligence and image processing method to determine the context of the first photo uploaded by the first user, to determine the context of each new photo, and to arrange the first photo uploaded by the first user and the new photos in an order based on the context to create a story;

publishing the combined story content as photo story game based on communications over the network to increase the engagement of the user in a platform.

2. The computer-implemented method of claim 1, wherein the story content is associated with a photo or audio-video story concept.

3. The computer-implemented method of claim 1, further comprising: triggering the second user from the plurality of collaborators to participate or collaborate, wherein the triggering comprises sending an email, a notification, a SMS message, or a chat message.

4. The computer-implemented method of claim 1, wherein second user may further create a trigger and trigger the story with other users over the network to collaborate.

5. The computer-implemented method of claim 1, further comprising: enabling, by the computing device, the second user to perform at least one of: like the first photo and the first caption, view the first photo and the first caption, share the first photo and the first caption, follow the first user, comment on the first photo and the first caption, report the first photo and the first caption, edit an additional data, delete the additional data, add a new photo with an interesting new caption similar or related to the first photo uploaded by the first user and report the first user.

6. The computer-implemented method of claim 1, further comprising: publishing the story for viewing over the network.

7. The computer-implemented method of claim 1, wherein recommended additional data received from the second user of the plurality of collaborators is different than the first photo and the first caption received from the first user of the plurality of collaborators.

8. The computer-implemented method of claim 1, further comprising: determining a reward for each of the plurality of collaborators submitting selected story content.

9. A computer device for creating a photo story by a plurality of collaborators each capable of supplying story content over a network, the computer device including:
   a processor; and
   a memory storing data including data records of the plurality of collaborators, wherein the processor is configured to:
   receive a trigger created by a first user, wherein the first user and a second user are selected from the plurality of collaborators each capable of supplying the story content;
   display, on a user interface of the computing device associated at least with the second user, at least a first photo, and a first caption associated with the first photo uploaded by the first user, the first photo and the first caption are displayed when the second user clicks on the received trigger;
   initiate, by the computing device, a total activation time (TAT) for receiving the story content over the network from the plurality of collaborators, which starts when the second user clicks on the received trigger; or
   initiate, by the computing device, a total activation time (TAT) pre-defined by the first user, for receiving the story content over the network from the plurality of collaborators, which starts when the second user clicks on the received trigger; and
   enable the plurality of collaborators to post new photos, and new captions associated with the new photos, which are related to the first photo and first caption uploaded by the first user;
   using artificial intelligence and image processing methods to determine the context of the first photo uploaded by the first user, to determine the context of each new photo, and to arrange the first photo uploaded by the first user and the new photos in an order based on the context to create a story; and
   publishing the combined story content as photo story game based on communications over the network to increase the engagement of the user in a platform.

10. The computer device of claim 9, wherein the story content is associated with a photo or audio-video story concept.

11. The computer device of claim 9, wherein the processor is further configured to:
    determine story content selected through online voting conducted over the network; or determine story content selected by the first user; and delete remaining story content other than the selected story content; or
    notify the first user of a change suggested by the second user, wherein the notifying comprises sending an email, a SMS message, or a chat message; or
    enable, by the computing device, the second user to perform at least one of: like the first photo and the first caption, view the first photo and the first caption, share the first photo and the first caption, follow the first user, comment on the first photo and the first caption, report the first photo and the first caption, edit an additional data, delete the additional data, add a new photo with an interesting new caption similar or related to the first photo of the first user and report the first user.

12. The computer device of claim 9, further comprising: triggering the second user from the plurality of collaborators to participate or collaborate, wherein the triggering comprises sending an email, a notification, a SMS message, or a chat message.

13. The computer device of claim 9, wherein recommended additional data received from the second user of the plurality of collaborators is of a different type than the first photo and the first caption received from the first user of the plurality of collaborators.

14. The computer device of claim 9, wherein the processor is further configured to: determine a reward for each of the plurality of collaborators submitting selected story content.

15. The computer device of claim 9, wherein the processor is further configured to: publish the story for viewing over the network.

16. A non-transitory computer-readable medium containing instructions to configure a processor to perform a method for creating a photo story by a plurality of collaborators each capable of supplying story content over a network, the method comprising:
    receiving a trigger created by a first user at a computing device associated at least with a second user, wherein the first user and the second user are selected from the plurality of collaborators each capable of supplying the story content;
    displaying, on a user interface of the computing device, at least a first photo and a first caption associated with the first photo uploaded by the first user the first photo and the first caption are displayed when the second user clicks on the received trigger;
    initiate, by the computing device, a total activation time (TAT) for receiving the story content over the network from the plurality of collaborators, which starts when the second user clicks on the received trigger; or initiate, by the computing device, a total activation time (TAT) pre-defined by the first user, for receiving the story content over the network from the plurality of collaborators, which starts when the second user clicks on the received trigger; and enabling the plurality of collaborators to post a new photos and a new captions associated with the new photos, which are related to the first photo and first caption uploaded by the first user;

using an artificial intelligence and image processing methods to determine the context of the first photo uploaded by the first user, to determine the context of each new photo, and to arrange the first photo uploaded by the first user and the new photos in an order based on context to create a story;

publishing the combined story content as photo story game based on communications over the network to increase the engagement of the user in a platform.

* * * * *